United States Patent
Jordan et al.

(10) Patent No.: US 10,607,829 B2
(45) Date of Patent: Mar. 31, 2020

(54) TRANSITION RADIATION LIGHT SOURCES

(71) Applicants: BNNT, LLC, Newport News, VA (US); JEFFERSON SCIENCE ASSOCIATES, LLC, Newport News, VA (US)

(72) Inventors: Kevin C. Jordan, Newport News, VA (US); Thomas G. Dushatinski, Chesapeake, VA (US); Michael W. Smith, Newport News, VA (US); Jonathan C. Stevens, Williamsburg, VA (US); R. Roy Whitney, Newport News, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

(21) Appl. No.: 16/330,218

(22) PCT Filed: Sep. 6, 2017

(86) PCT No.: PCT/US2017/050287
§ 371 (c)(1),
(2) Date: Mar. 4, 2019

(87) PCT Pub. No.: WO2018/048906
PCT Pub. Date: Mar. 15, 2018

(65) Prior Publication Data
US 2019/0228961 A1    Jul. 25, 2019

Related U.S. Application Data

(60) Provisional application No. 62/383,853, filed on Sep. 6, 2016, provisional application No. 62/397,050, filed
(Continued)

(51) Int. Cl.
*H01J 63/06* (2006.01)
*H05H 6/00* (2006.01)
(Continued)

(52) U.S. Cl.
CPC ............... *H01J 63/06* (2013.01); *G21K 5/00* (2013.01); *H01J 63/02* (2013.01); *H01S 3/00* (2013.01);
(Continued)

(58) Field of Classification Search
CPC .. H01J 63/02; H01J 63/06; G21K 5/00; H01S 3/00; H01S 3/169; H05H 6/00; H05H 9/00; H05G 2/00
See application file for complete search history.

(56) References Cited

U.S. PATENT DOCUMENTS 7,702,076 B2 *  4/2010  Yamada .................... H01S 4/00
                                                        372/5
10,236,090 B1 *  3/2019  Areti ......................... G21G 1/10
(Continued)

FOREIGN PATENT DOCUMENTS

| WO | 2012/095644 | 7/2012 |
| WO | 2015/082295 | 6/2015 |

OTHER PUBLICATIONS

Artru et al, Carbon Nanotubes and Fullerites in High-Energy and X-Ray Physics, Physics Reports 412 (2005) 89-189 (Year: 2005).*
(Continued)

*Primary Examiner* — David E Smith
(74) *Attorney, Agent, or Firm* — Joshua B. Brady; Nixon & Vanderhye, P.C.

(57) ABSTRACT

Transition radiation from nanotubes, nanosheets, and nanoparticles and in particular, boron nitride nanomaterials, can be utilized for the generation of light. Wavelengths of light of interest for microchip lithography, including 13.5 nm (91.8 eV) and 6.7 nm (185 eV), can be generated at useful intensities, by transition radiation light sources. Light useful
(Continued)

for monitoring relativistic charged particle beam characteristics such as spatial distribution and intensity can be generated.

18 Claims, 11 Drawing Sheets

Related U.S. Application Data on Sep. 20, 2016, provisional application No. 62/398,941, filed on Sep. 23, 2016, provisional application No. 62/427,506, filed on Nov. 29, 2016.

(51) Int. Cl.
| | | |
|---|---|---|
| *H01S 3/00* | (2006.01) | |
| *H01S 3/16* | (2006.01) | |
| *G21K 5/00* | (2006.01) | |
| *H05G 2/00* | (2006.01) | |
| *H01J 63/02* | (2006.01) | |
| *H05H 9/00* | (2006.01) | |
| *B82Y 20/00* | (2011.01) | |

(52) U.S. Cl.
CPC .............. *H01S 3/169* (2013.01); *H05G 2/00* (2013.01); *H05H 6/00* (2013.01); *B82Y 20/00* (2013.01); *H05H 9/00* (2013.01)

(56) References Cited

U.S. PATENT DOCUMENTS

| | | |
|---|---|---|
| 2002/0104970 A1 | 8/2002 | Winter et al. |
| 2007/0152171 A1* | 7/2007 | Goldstein ........... G03F 7/70025 250/492.3 |
| 2010/0061516 A1* | 3/2010 | Freudenberger ........ H01J 35/06 378/134 |
| 2010/0230611 A1 | 9/2010 | Fukuyama |
| 2012/0186742 A1* | 7/2012 | Kang ........................ B32B 5/26 156/324 |
| 2014/0255973 A1 | 9/2014 | Nichiporuk et al. |
| 2016/0227639 A1* | 8/2016 | Kaminer .................. H05G 2/00 |
| 2016/0301180 A1* | 10/2016 | Nikipelov ................. H01J 1/34 |

OTHER PUBLICATIONS

International Search Report for PCT/US2017/050287, dated Feb. 7, 2018, 2 pages.
Written Opinion of the ISA for PCT/US2017/050287, dated Feb. 7, 2018, 6 pages.
Shul'Ga et al., "Transition radiation of fast charged particles on a fiber-like target, thin plates and atomic strings", Nuclear Instruments and Methods in Physics Research, 2003, pp. 78-82.
Artru et al., "Carbon nanotubes and fullerites in high-energy and X-ray physics", Physics Reports, 2005, pp. 89-189.

* cited by examiner

TRANSITION RADIATION LIGHT SOURCES

CROSS REFERENCE TO RELATED APPLICATIONS

This application is the U.S. national phase of International Application No. PCT/US2017/050287 filed Sep. 6, 2017, which designated the U.S. and claims the benefit of U.S. Provisional Patent Application No. 62/383,853 filed Sep. 6, 2016, U.S. Provisional Patent Application No. 62/397,050 filed Sep. 20, 2016, U.S. Provisional Patent Application No. 62/398,941 filed Sep. 23, 2016, and U.S. Provisional Patent Application 62/427,506 filed Nov. 29, 2016, the entire contents of each of which are incorporated by reference in their entirety.

STATEMENT REGARDING GOVERNMENT SUPPORT

This invention was made in part with government support under Management and Operating Contract No. DE-AC05-06OR23177 awarded by the Department of Energy. The United States Government has certain rights in the invention.

FIELD OF THE INVENTION

The present disclosure relates to transition radiation from nanotubes, nanosheets and nanoparticles, and in particular, boron nitride materials for the generation of light. The general methods and implementations discussed herein may be used for the production of 13.5 nm (91.8 eV) and 6.7 nm (185 eV) light useful for, as an example, microchip lithography, and for the production of light useful for monitoring relativistic charged and near relativistic charged particle beam's spatial distribution characteristics.

BACKGROUND—INTRODUCTION

Transition radiation (TR) occurs when a relativistic charged particle transitions across a boundary between two materials with different relative permittivities, also known as dielectric constants. The TR broadband radiation phenomenon is well understood and investigated and is utilized in a variety of high energy physics, nuclear physics, and satellite detectors and in a variety of beam line monitors for particle beam accelerators. TR has been minimally utilized for photon sources in detectors of relativistic charged particles and it has been suggested that this might be possible to make more intense TR sources of photons. TR intensity is roughly proportional to the relativistic particle's energy, E, and the opening half angle of the TR photon radiation along the particle's path is roughly the Lorentz factor, $\gamma = E/mc^2$.

TR photon sources are not widely developed, as the technology to date does not produce sufficient photon intensity to be of use in most situations.

Materials utilized for TR radiators have typically been thin silicon wafers or metal foils, including multiple layers of foils, or layers of randomly oriented foams or fibers of polyethylene, polypropylene, or similar materials. Depending on the system, the foils, foams, or fibers may be in vacuum, gas, or other material that allows the TR photons of interest to pass through the material. The design goals of typical TR systems include but are not limited to optimizing the number of useable photons, optimizing the distribution and positions of the TR photons, minimizing the self-absorption of the TR photons by the TR material, and maximizing the number of TR surfaces in the overall TR system.

Accelerator systems associated with relativistic charged particle beams, energy recovering linacs, multiple beam accumulation and beam rastering are known by the international accelerator community, but without an effective transition radiation material have limited use in generating TR beams of photons beyond relativistic charged particle detection.

SUMMARY

This disclosure describes generating TR utilizing inorganic nanosheets, nanotubes, and/or nanoparticles, including for example high quality boron nitride nanosheets (BNNSs and high quality boron nitride nanotubes (BNNTs)). As used herein, the phrase "high quality" BNNSs generally refers to sheets of hexagonal boron nitride (h-BN) material having typically 5 or less atomic layers, and the phrase "high quality" BNNTs generally refers to BNNTs having few walls, few defects, diameters less than 10 nm, highly crystalline structures, and manufactured using a catalyst-free process. While high quality BNNSs and BNNTs may be preferred in some embodiments, it should be understood that BNNSs and BNNTs may be employed unless explicitly stated otherwise. Materials such as BNNTs may be used to generate TR when placed in a relativistic electron beam, including for example the production of 13.5 nm (91.8 eV) and 6.7 nm (185 eV) light useful for microchip lithography, and for the production of light that can be utilized for determine relativistic charged particle beam properties. While lower quality nano materials (e.g., BNNT materials that may not have one or more of the following: few walls, few defects, diameters less than 10 nm, highly crystalline structures, and been manufactured as catalyst-free) can also be utilized, the transparency at some photon energies, lack of metallic impurities, ability to provide random alignment, and possibly lower plasma frequency in the case of carbon nanotubes (CNTs) and graphene, make the high quality BNNS and BNNT the preferred implementations.

The BNNS and BNNT materials provide several orders of magnitude greater number of TR surface boundaries per unit mass as compared to typical metal foils and polymer foams and fabrics. Consequently, significantly more efficient TR sources can be fabricated with BNNS and BNNT materials, and especially with high quality BNNSs and BNNTs. In particular, BNNSs with few (i.e., about 1 to 5) layers of h-BN, and equivalently few walls of h-BN for BNNT. Used as TR materials, BNNSs and BNNTs provide an increase of several orders of magnitude in the intensity of photons compared to existing TR radiators, which allows the development of useful TR sources of photons for a variety of applications, including, for example, microchip lithography and low mass particle beam monitors.

DETAILED DESCRIPTION

Figure 1:
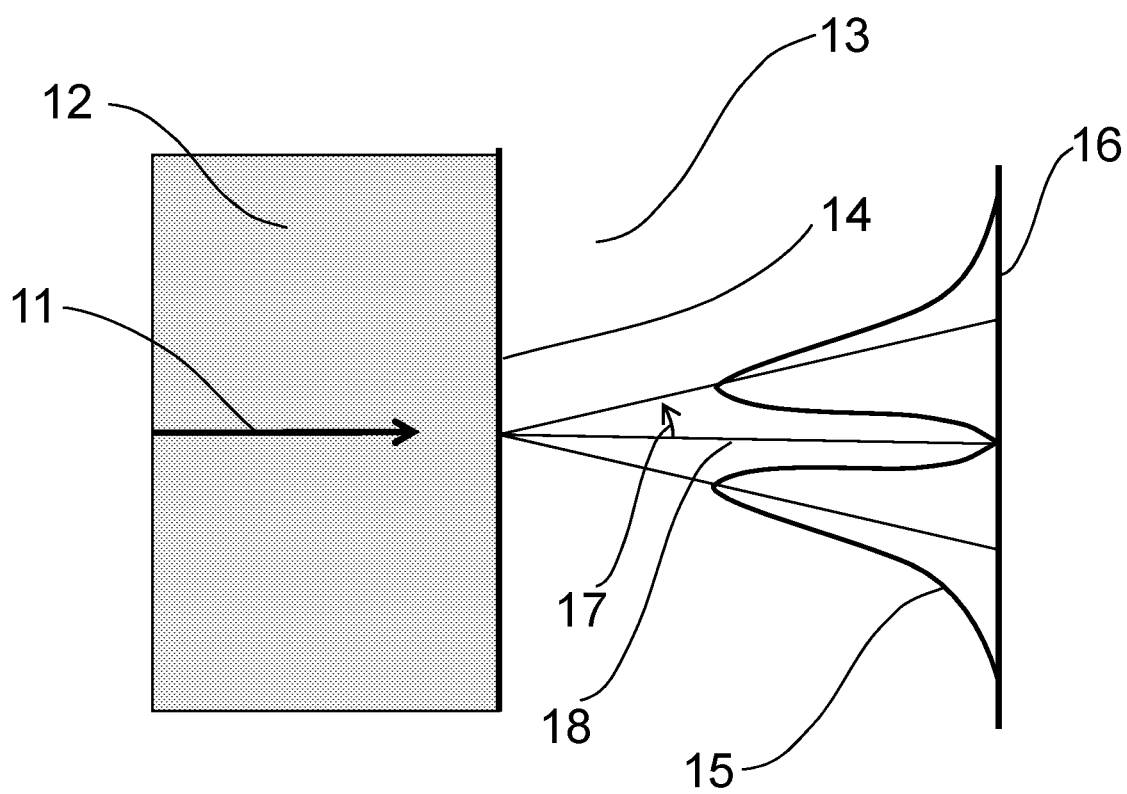
FIG. 1 illustrates of the generation of TR according to an embodiment of the present approach.

Transition radiation from nanotubes, nanosheets, and nanoparticles and in particular, boron nitride nanomaterials, can be utilized for the generation of light. Disclosed herein are various embodiments employing a transition radiation material having at least one of a nanotube material, a nanosheet material, and a nanoparticle material. The material may include a boron nitride nanomaterial, such as boron nitride nanotubes, boron nitride nanosheets, boron nitride nanotube powder, boron nitride nanotube mats, boron nitride nanosheet powders, boron nitride nanosheet mats, boron nitride nanotube threads, and boron nitride nanosheet threads. FIG. 1 illustrates TR occurring when a relativistic charged particle 11 (which may also include nearly relativistic charged particles moving at least ten percent of the speed of light, and in some embodiments slower as those of ordinary skill in the art understand that light production drops significantly when particles are not relativistic) transitions across a boundary 14 between two materials 12 and 13 (one of which may be a vacuum), with different relative permittivities, also known as dielectric constants. The TR phenomenon is well understood and investigated, and is utilized in a variety of high energy physics, nuclear physics, and satellite detectors, and in a variety of beam line monitors for particle beam accelerators. While the TR phenomenon has been suggested as a source of photon beams, TR is not widely utilized due to the low intensity of light produced with current implementations, or in the case of relativistic charged particle beam detectors due to the heavy preference for detectors with low mass per unit area. TR intensity distribution 15 for a single boundary 14 at a photon detection layer 16 is roughly proportional to the relativistic charged particle's energy, E, and the opening angle 17 of the TR photon radiation along the particle's path 18 is roughly the Lorentz factor, $\gamma=E/mc^2$. As one of ordinary skill in the art of TR should appreciate, in typical TR systems to amplify the number of photons produced, multiple TR boundaries or surfaces are introduced that may consist of multiple foils or wafers, or various foams and fibrous mats.

The TR total intensity for a single TR surface placed in a vacuum is: $S=\alpha\omega_p\gamma/3$ where $\alpha$ is the fine structure constant, 1/137, and $\omega_p$ is the plasma frequency expressed in eV. The TR intensity distribution for a single TR surface in the region of photon energy, E expressed in eV, to be considered is: $dS/dE=2\alpha\ln(\omega_p\gamma/E)/\pi$. Maximizing the intensity of a TR light source comes in part from maximizing the number of TR surfaces encountered by the relativistic electron beam. The thicknesses of the dielectric material also are important for determining the formation length that has an inverse relationship with the wavelength, i.e. as the wavelength of the light shortens the formation length increases. When the wavelength of the light is longer than the formation length the photons making up the light produced reach their maximum intensity and when the wavelength of the light is less than the formation length the intensity is reduced. There is not a sharp transition and in a given embodiment for a given range of wavelengths of interest there can be a tradeoff between having an optimum distribution of formation lengths in the TR material and having an optimum number of TR surfaces.

Figure 2:
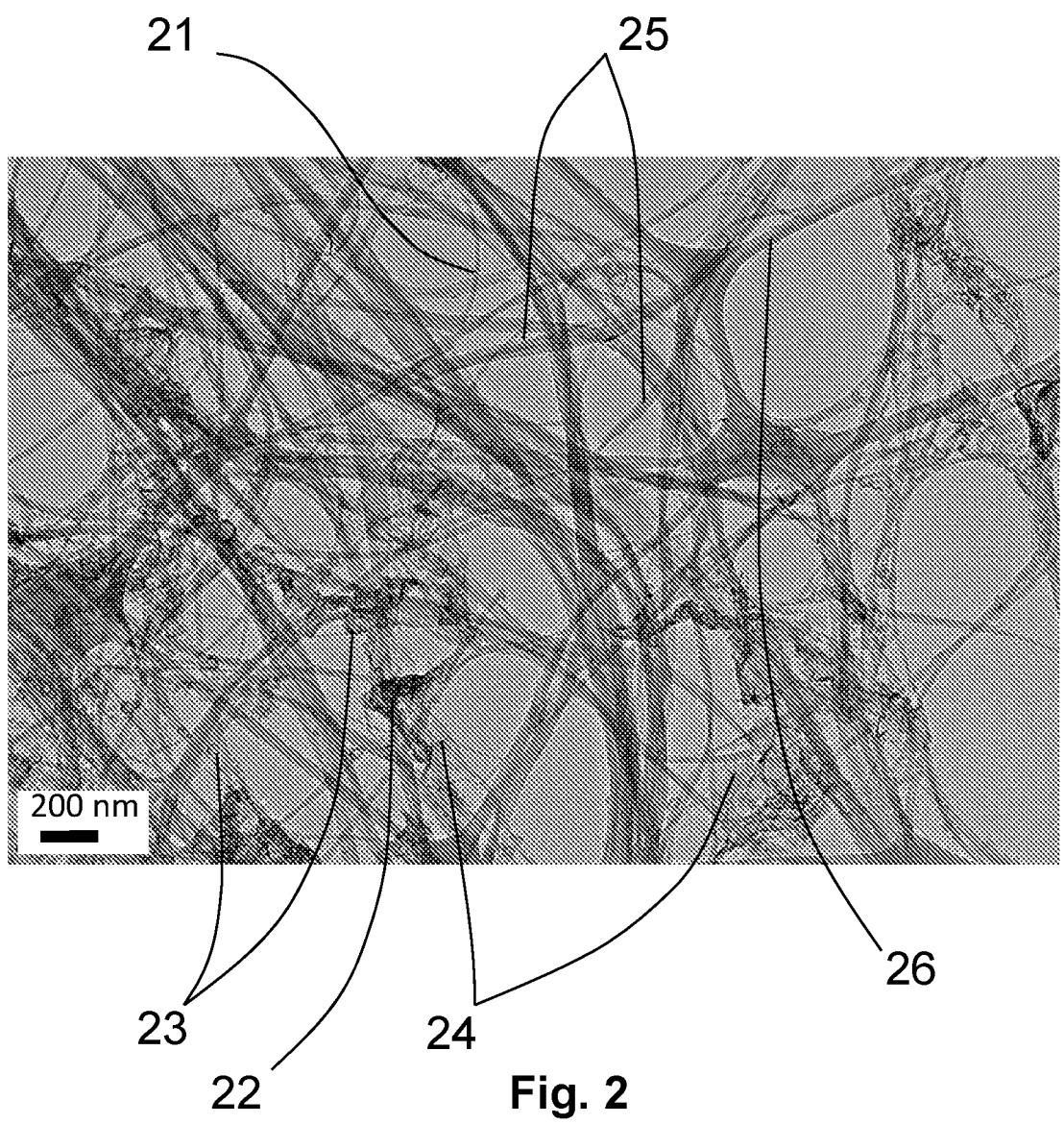
FIG. 2 shows a TEM of purified as-synthesized BNNT material that may be used in the present approach.

As shown in the TEM image in FIG. 2, purified high quality BNNT material, in this instance highly crystalline material 21 with typical diameters of 2 nm to 10 nm and lengths of 100s of nm to 100s of microns, can form a mostly random arrangement of BNNTs. Generally, "high quality" BNNT refers to BNNTs having few walls (e.g., 1-8 walls, with a peak or mode at 2 walls), few observable defects in crystalline structure, diameters less than about 10 nm, highly crystalline structures, and normally (but not necessarily) manufactured as catalyst-free. It should be appreciated that high quality BNNS and BNNT are preferred for embodiments described herein, but the embodiments are not intended to be limited to high quality BNNS and/or BNNT applications unless specifically recited in an appended claim. For the material shown in FIG. 2 there are also small particle impurities of boron, boron nitride and hexagonal boron nitride as observed in the impurity clump 22. These impurities 22 have minimal impact on the generation of TR when they are below about 200 nm in diameter, and represent less than about 50% of the overall mass of the material. h-BN nanocages 23 and h-BN nanosheets 24 may also be present, and such structures have minimal impact on the generation of TR when they are below 200 nm in diameter, and represent less than about 50% of the overall material mass. Some of the BNNTs fiberize or align with other BNNTs as seen in the grouping at several locations 25. This alignment has minimal effects on the generation of TR. The lacy carbon grid 26 used as the support grid for the TEM image is also seen in FIG. 2.

Figure 3:
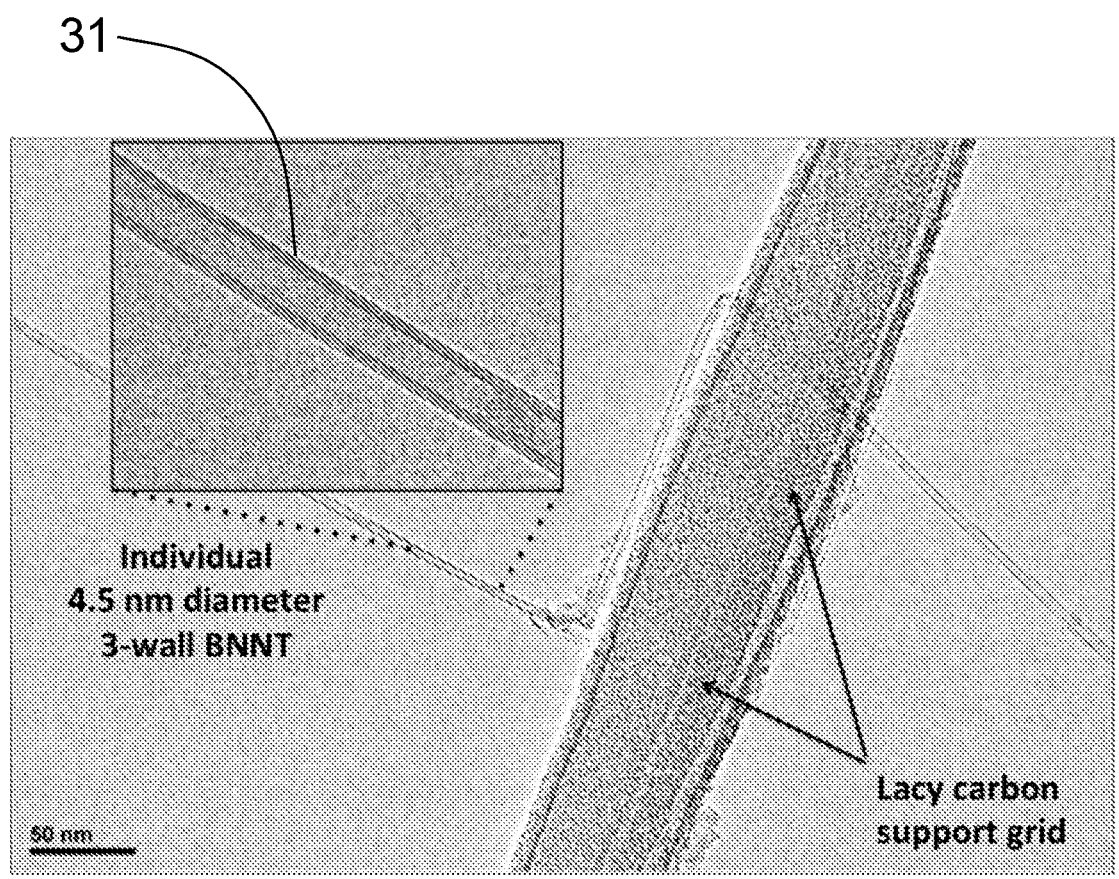
FIG. 3 shows a TEM image of an individual 3-wall BNNT that may be used in the present approach.

FIG. 3 shows a TEM image of an individual 3-wall BNNT 31 attached to a Lacy carbon support grid. As shown in FIG. 3, individual BNNTs 31 produced for an exemplar embodiment had a highly crystalline structure with few walls. The particular BNNT shown in FIG. 3 has 3 walls of BN wrapped in a cylinder, thereby forming a 3-wall BNNT. In the case of BNNS (not shown in FIG. 3), what is typically labeled or referred to as walls when referring to BNNT are flat and typically labeled or referred to as layers or BN layers in BNNS materials. The distribution of wall number for as-produced high quality BNNT is typically 1 to 8 walls with the peak in wall number at 2 walls. The lacy carbon grid is utilized to support the BNNT when making the TEM image, but may not be present in some embodiments of the present approach. High quality BNNS with an average number of BN layers of 2 or less has been reported in the literature.

BNNTs manufactured to include a minimum number of walls (normally expressed in terms of the average number of walls, or the peak or mode in wall number), and having a minimum amount of impurities, are preferred for optimizing a TR source in some embodiments of the present approach. The distribution of the number of walls can be determined by statistically surveying the BNNT material with TEM images, such as the type shown in FIGS. 2 and 3. As will be appreciated by those of ordinary skill in the art, the peak wall number may be an approximation. Separate from h-BN nanocages and h-BN nanosheet impurities, purified BNNT material with a boron particle impurity less than 1% of bulk material weight, and having an average of about 2 walls, are particularly preferred for some embodiments. Boron particle impurities have a high absorption of the TR photons for most wavelengths, while the h-BN materials do not typically have a high absorption of the TR photons. The boron particles and in some embodiments h-BN nanocages and h-BN nanosheets can be removed by the purification processes, typically involving water vapor in the 450° C. to 750° C. range as discussed in U.S. Provisional Patent Application 62/427,506 which is incorporated by reference in its entirety. High quality BNNS material may also be used, and preferably the BNNS material contains impurities less than about 10% of bulk material weight. High quality BNNS material can be produced from starting with BNNT material, and in some preferred embodiments BNNT material that has an average wall number of about 3-walls, by a number of techniques. BNNS production techniques include, for example, a sequence of wet chemistry sonication, nitric acid baths, rinsing, centrifuging and selective separation and drying. The resultant material typically has an average length of only a few microns, but lengths on this order are acceptable for many embodiments of the present approach: TR depends on the number of surface boundaries encountered and the thickness of the material, and not the length of the BNNT material. If high quality BNNS material is utilized, some embodiments may advantageously use BNNSs having widths on the order of about 100 nm to several microns across. This approach improves target uniformity and radiation loss as discussed further below. In addition, highly sonicating BNNT material can produce BNNS. For example, sonicating BNNT material for durations of about an hour can convert a significant fraction of the BNNT material—in some embodiments up to 50% of the BNNT material—into BNNS material. In some embodiments, the TR material may be mixtures of BNNT and BNNS, hereafter referred to as BNNS-BNNT. In addition, the purified BNNT material typically contains h-BN as nanosheets and h-BN as nanocages. These h-BN materials contribute favorably to the TR generation in some embodiments as they also provide transition radiation surfaces. However, the h-BN material typical formation length may be different from that of the BNNS-BNNT material. This difference may affect the efficiency in production of TR at a given wavelength in a given embodiment. It should be appreciated that the relative amount of BNNT and BNNS in a BNNS-BNNT TR material may vary in different embodiments.

Figure 4:
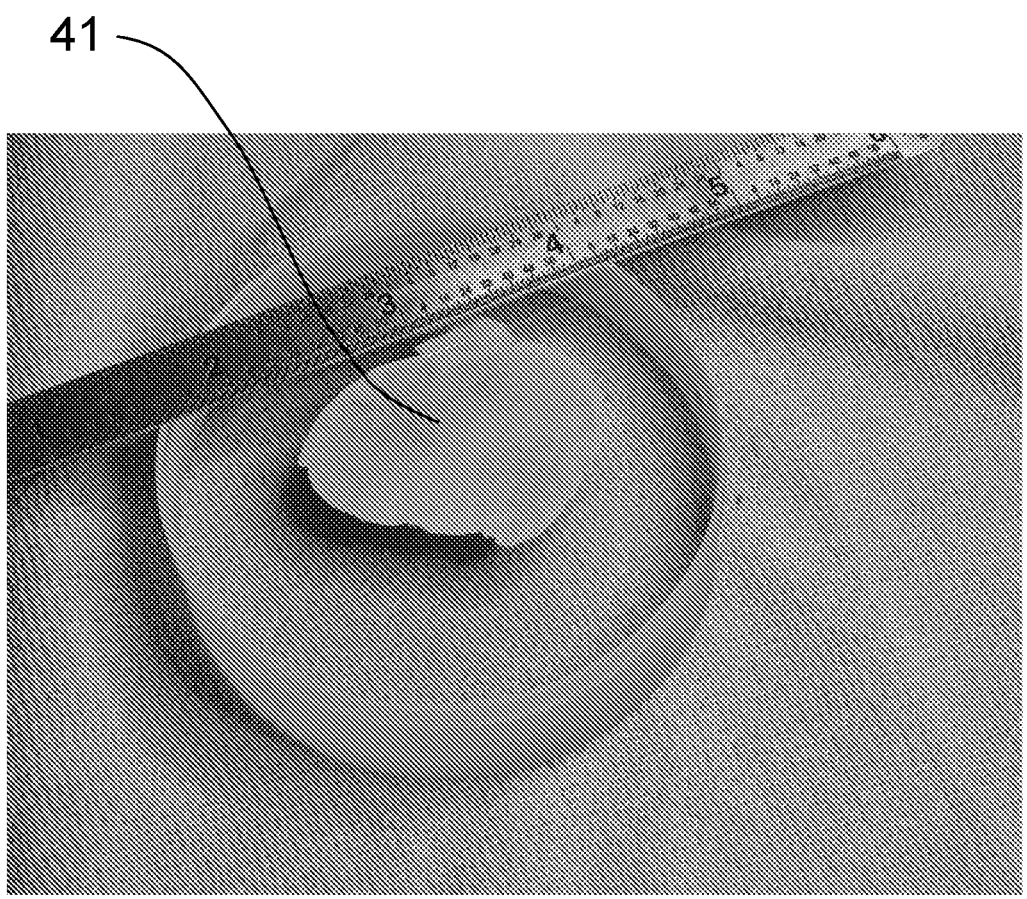
FIG. 4 is a photo of a 100-micron thick BNNT mat that may be used in the present approach.

FIG. 4 shows a prototype mat 41 of BNNT material approximately 100 microns thick and having a density of approximately 0.5 g/cm$^3$. The high quality BNNT material used to generate mat 41 in FIG. 4 is roughly 50% BNNT by mass, with the remaining 50% being a mixture of boron particles, boron nitride, and h-BN nanosheets and nanocages. The h-BN structures are typically in the range of about 10 to about 50 nm width, though it should be appreciated that there may be larger structures in the BNNT material. FIG. 2 shows examples of h-BN nanocages 23 and h-BN nanosheets 24. The particles being relatively very small also contribute to the available TR surfaces, though TR material preferred for some embodiments may have these "impurity" particles removed for some light wavelengths of interest. On average, impurity particles are slightly less efficient at producing TR compared to BNNTs and BNNSs, because impurity particles are often larger in size and lack internal surfaces that would otherwise contribute to TR. BNNT mat 41 may be useful for low intensity sources of light, and for light where the photon is high enough such that the absorption is minimal in the mat. In some embodiments, the BNNTs that make up the mat may be initially processed via wet chemistry, such as discussed above, to form nanotubes on the order of a few microns in length, and then purified in the as discussed above and in U.S. Provisional Patent Application 62/427,506, incorporated by reference in its entirety.

Figure 5:
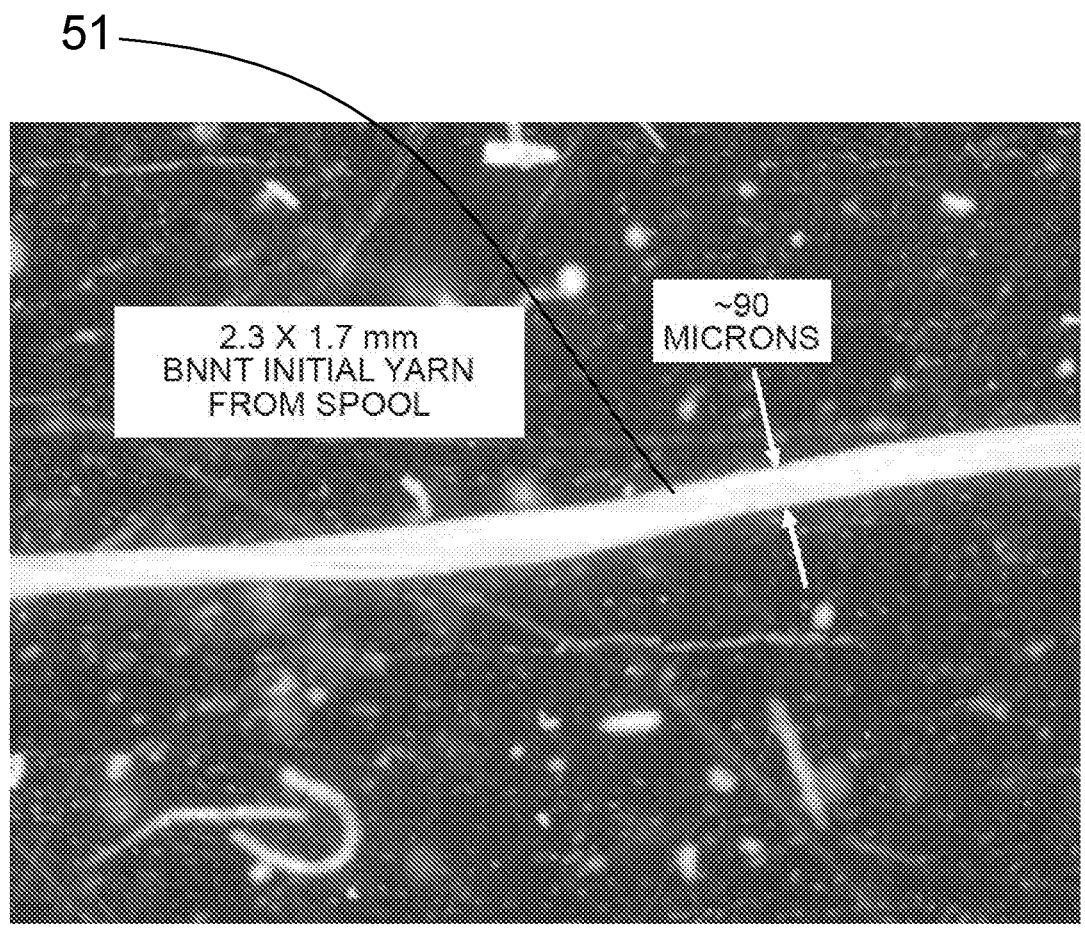
FIG. 5 shows an SEM image of a BNNT initial yarn approximately 90 microns in diameter.
Figure 6:
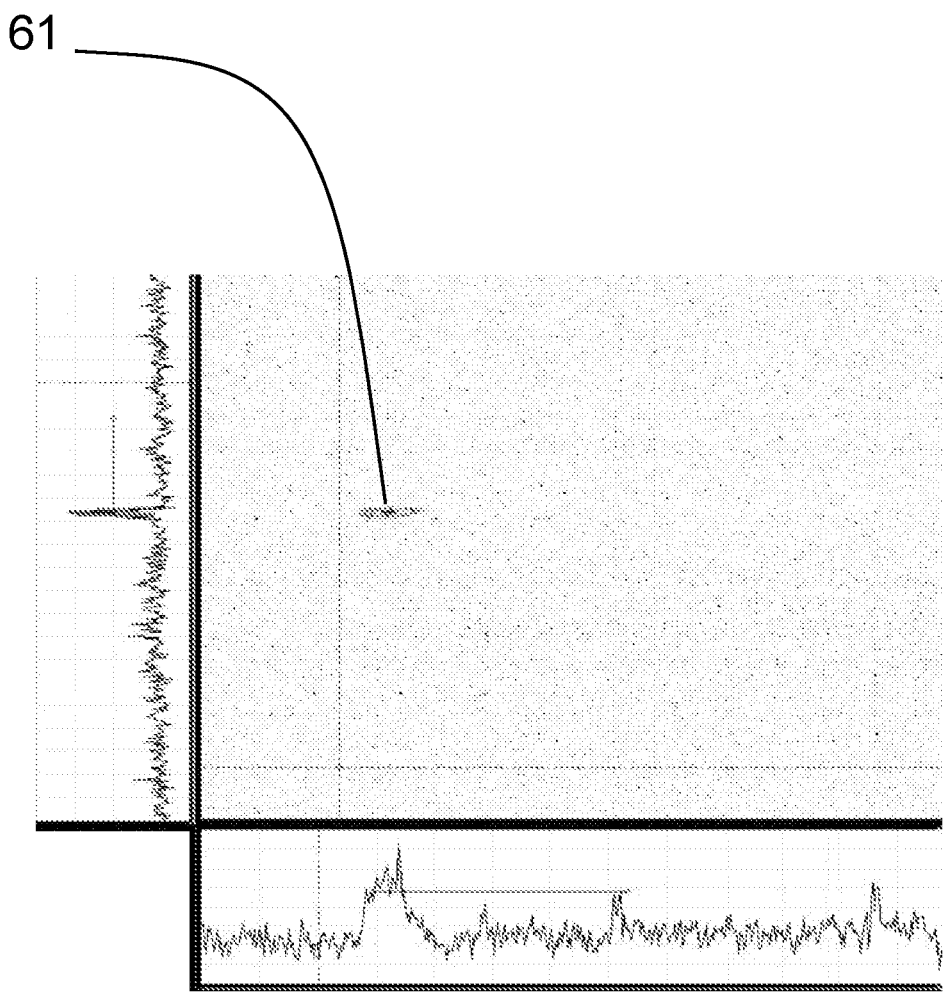
FIG. 6 shows an image capture of TR radiation from a 50 MeV electron beam impinging on a BNNT initial yarn.

In particle beam accelerators, the profile of the particle beam can be measured by running a fine wire or thread through the beam and observing various radiation patterns coming from the wire or thread. FIG. 5 shows an example of a 90-micron diameter BNNT initial yarn 51, also known as a BNNT thread. In some embodiments of the present approach, a BNNT thread may be positioned within or pulled through a target volume as discussed below. Such embodiments may be especially useful for beam profiling embodiments. A BNNT thread similar to the one shown in FIG. 5 was utilized to produce the TR radiation pattern shown in FIG. 6. The TR radiation pattern 61 in FIG. 6 is in the optical wavelength region, and was produced by a 50 MeV, 3-mm wide electron beam impacting on a 100-micron diameter BNNT thread similar to the 90-micron diameter BNNT initial yarn 51 shown in FIG. 5. The TR radiation pattern was observable because of the nearly 10,000 surfaces in the BNNT thread, where the number of surfaces has been estimated based on the density of the BNNT thread and the average number of walls of the BNNTs. These surfaces produced ample optical photons for the camera to detect the pattern 61 shown in FIG. 6.

Carbon nanotubes (CNTs) and graphene, the carbon equivalent of BNNS, can also be utilized for the production of TR light, however they would not be the preferred implementation as CNT plasma frequency is on the order of 10 eV or less, at least according to some references. The BNNTS and BNNT plasma frequencies are calculated to be approximately 29 eV utilizing the standard method, where the plasma frequency is 28.81 $(\rho Z/A)^{1/2}$ eV, $\rho$ is the density in g/cm$^3$, Z is the atomic number and A is the atomic weight. There are currently no other available reference measurements for BNNS or BNNT plasma frequencies. The amount of TR photons at a given wavelength increases with logarithm of the plasma frequency. Consequently, BNNS and BNNT are generally preferred over CNT or graphene, though CNT and graphene may be preferred in some implementations. In particular, CNT and/or graphene may be preferred in embodiments in which the creation of a target is more easily accomplished by electrically conductive particles of CNT and/or graphene, instead of electrically insulating BNNS-BNNT. In addition, other nanomaterials with characteristic dimensions below 1 micron and in some cases micro materials with characteristic dimensions below 100 microns such as particles of BN, aluminum oxide, aluminum nitride, carbon boride, etc. can be utilized. A question for each of these that they are optically transparent at the wavelengths of light of interest in a given embodiment. To that end, these additional particles may have an average size optimized for one or more desired wavelengths. and if they can be produced in the optimal powders, mats or threads as appropriate for a given embodiment. The mass density per unit area may also be a consideration for some embodiments where having minimal mass producing the optimal number of surfaces is desired.

A BNNS-BNNT TR light source may be created by placing BNNS-BNNTs in a relativistic electron beam. While a large variety of TR light sources are possible, an example of a TR light source optimized for the production of 13.5 nm (91.8 eV) and 6.7 nm (185 eV) light will be considered in some detail as these two wavelengths of light are of particular interest for microchip lithography.

Figure 7:
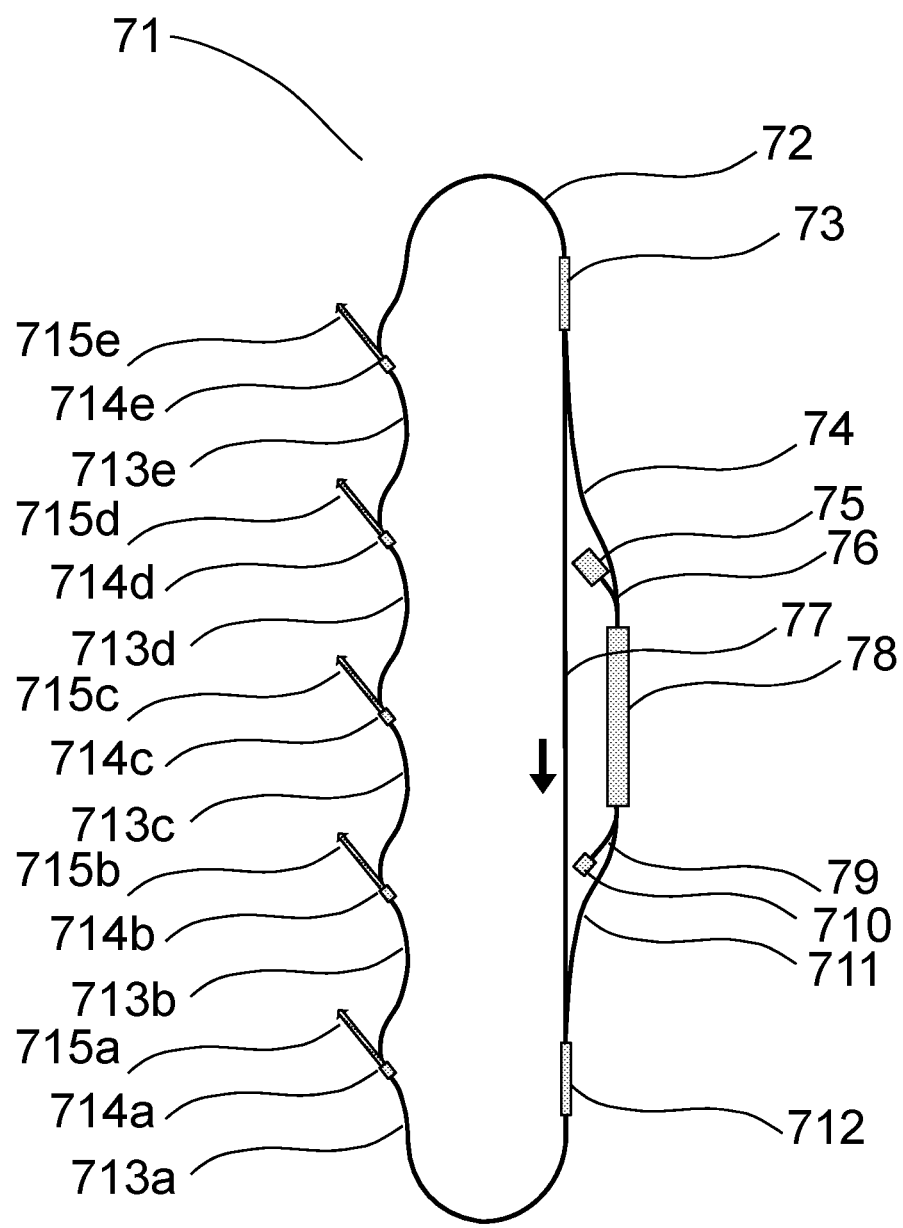
FIG. 7 illustrates a schematic for a TR light production system according to an embodiment of the present approach.

FIG. 7 illustrates a schematic for a TR light source 71, and components along electron beam path 72. This embodiment may be appropriate for applications such as microchip lithography, among others as would be appreciated by those of ordinary skill in the art. This example assumes an electron beam of 200 MeV (after acceleration), though the present approach may be used in embodiments having an electron beam at a few MeV to multiple GeV. In this embodiment, an injector 75 provides an initial electron beam of about 2 MeV to about 5 MeV, via a short beam line 76 to a linear electron accelerator 78. Accelerator 78 increases the energy to about 200 MeV, less the 2 MeV to 5 MeV provided by the injector 75. Injector 75 may be, for example, a 3 MeV injector. While in principle the linear accelerator 78 may be a room temperature accelerator or a cryogenic accelerator, in preferred implementations the linear accelerator 78 may be a cryogenic accelerator that can function as an energy recovery linac (ERL). Embodiments in which the accelerator functions as an ERL can be energy efficient.

In the embodiment shown in FIG. 7, the electron beam leaves the linear accelerator 78 at 200 MeV along a beam line 711 that merges with the main light production loop 72 at the location of a merging septum 712. The linear accelerator typically uses radio frequency, RF, microwaves to accelerate bunches of electrons. The microwave cavities may be room temperature or superconducting temperatures for superconducting radio frequency (SRF) cavities as is well known to those of ordinary skill in the art of electron accelerators. SRF accelerators are typically more energy efficient. The merging septum 712 utilizes a combination of a long, narrow electrostatic element and a long, narrow magnetic element to merge the injected beam into the main light production loop beam path 72. In some embodiments, a transverse RF cavity may also be utilized as is well known by those of ordinary skill in the art of electron beam control for electron accelerators. The electron beam may be rastered across the acceptance of the main ring of the beam path 72 such that at the TR target locations 714a-714e the overall beam distribution on the target is uniform. In addition, the phase of the charge packets coming from the linear electron accelerator 78 may be kept out-of-phase with each other such that a large number of packets never arrives at any one location at any time in the main ring 72. Large number of charge packets arriving at a location creates space charge effects and/or coherent radiation effects that could disrupt the beam. However, as one of ordinary skill in the art would understand, in some embodiments it may be desirable to create coherent effects to amplify the amount of light produced in a narrow time frame or from coherent effects. Of course, such effects may not be desirable for microchip lithography, among some other potential applications. On the other hand, coherent effects may be advantageous for creating TR light for pulse- and pulse-probe-types of scientific experiments.

In the example TR light source 71, 5 TR light beams 715a-715e production targets 714a-714e are illustrated, each on a segment 713a-713e of the main light production loop 72. The number of TR light beam 715a-715e production targets 714a-714e may vary from 1 to over 20; FIG. 7 shows only 5 TR light beams for ease of illustration.

Every time an electron passes through a TR production target 714 it loses energy to the TR process, plus the electron loses a small amount of energy to ionization loss known as dE/dx at a rate of 2 MeV-cm$^2$/g. This effect is described more below. The energy loss mechanisms of synchrotron radiation and coherent synchrotron radiation can be eliminated for all practical purposes for a 200 MeV beam of the levels of beam current and peak beam current to be considered, by: (1) minimizing the magnetic fields wherever the electron beam is bent, (2) maximizing curvature of the bends, and (3) maximizing the cross-sectional area or diameters of the beam enclosures. The TR radiation loss will be the primary energy loss mechanism, especially if the TR targets 714a-714e operate as described below.

Following the TR target section, which in the FIG. 7 example comprises segments 713a-713e, targets 714a-714e and TR light beams 715a-715e repeated 5 times, the electron beam is returned to the back leg 77 for multiple circulations through the apparatus. A prototype system as described herein involved 1,000 passes through the TR target section, though it should be appreciated that other numbers of passes may be utilized. Such embodiments advantageously employ multiple electron beam accumulation. Following the 1,000$^{th}$ or final pass, a combination of an electrostatic septum narrow magnetic septum 73 and transverse RF fields may be used to extract the electron beam, and a sequence of magnets 74 may be used to direct the beam to the linear accelerator 78 where it is merged with the injector beam 76. The 1,000$^{th}$ pass beam is at nearly opposite phase of the RF power in the accelerator, such that the beam at that instance is de-accelerated to an energy close to the injection energy. The beam thereby deposits most of its energy into the RF fields in the linear accelerator 78, if the accelerator operates as an ERL. At the end of the linear accelerator 78 an electron beam of several MeV may be deflected 79 to a beam dump 710. As those of ordinary skill in the art would appreciate, care should be taken to control the electron bunch path as electron bunches traverse the full accelerator and end up at the beam dump 710, such that the electron bunches can be separated after the 1,000$^{th}$ pass through the TR targets 714a-714e.

Figure 8:
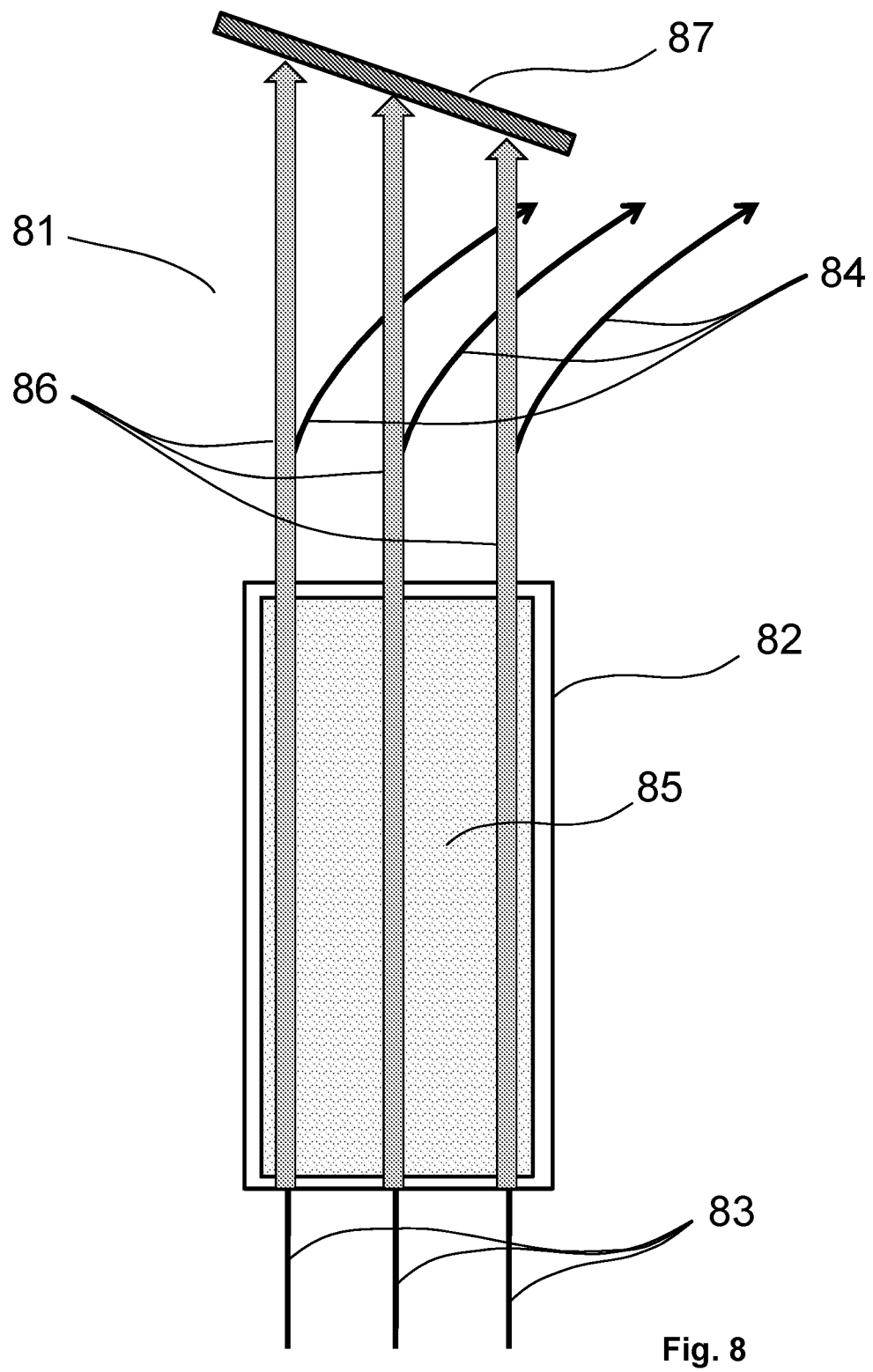
FIG. 8 illustrates a plan view of a TR light production region useful for microchip lithography according to an embodiment of the present approach.

FIG. 8 illustrates a plan view of a TR target 81 embodiment, such as the TR targets 714a-714e shown in FIG. 7. The electron beam 83 enters the target chamber 82 and passes through the region of the BNNS-BNNT material 85 creating the light beams 86. Although this embodiment is described as having 1,000 passes, only 3 of the 1,000 example individual electron beams 83 and light beams 86 are shown in the illustration. The electron beams 84 are bent away from the initial direction by a magnet (not shown) such that they miss the initial mirror 87. Mirror 87 redirects and focuses the light beams 86 to the direction of utilization as a source of light. The initial mirror 87 should be far enough away from the TR targets 714a-714e to withstand the heat produced in the TR target volume passing through chamber 82.

Figure 9:
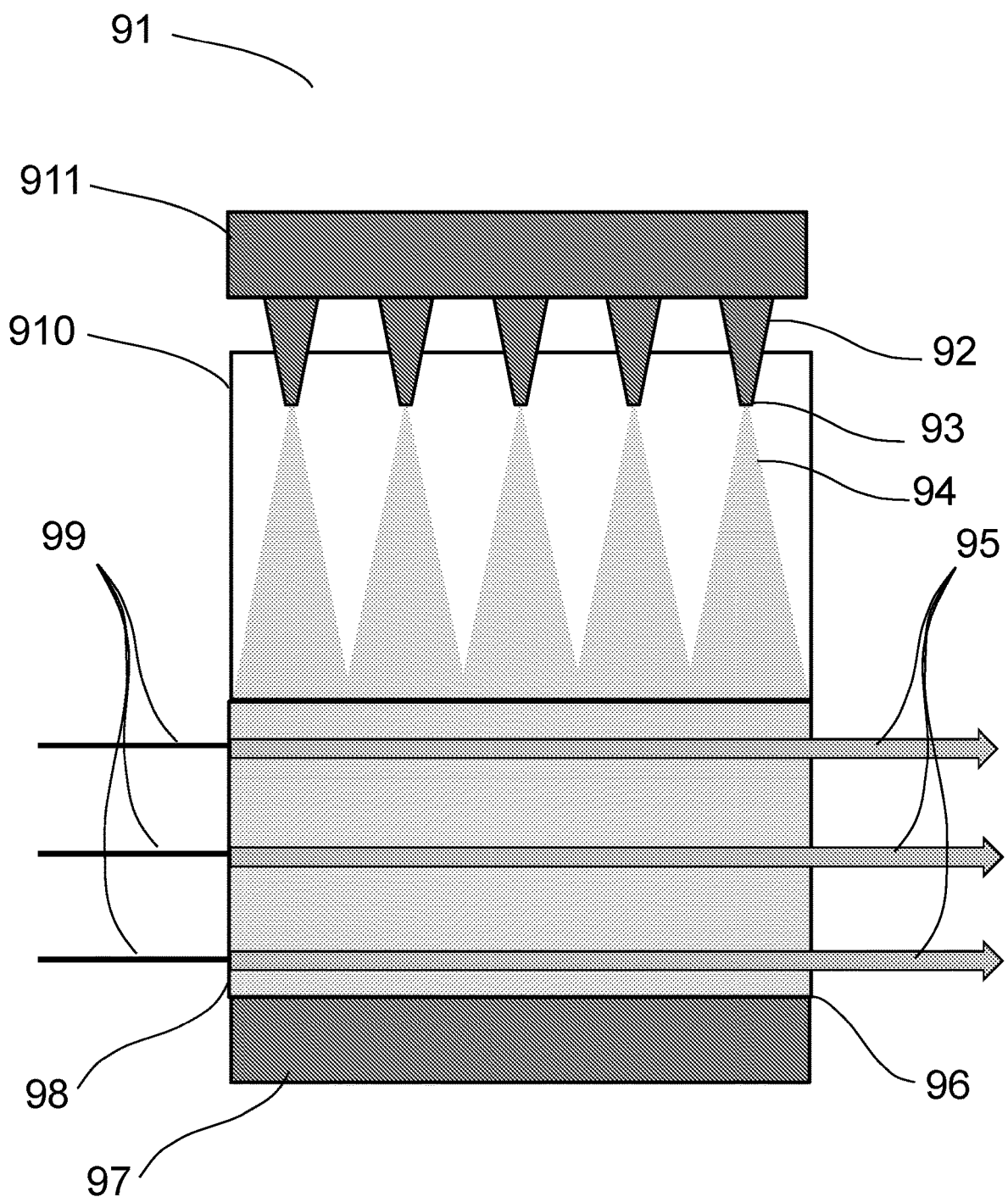
FIG. 9 illustrates the side view of a TR light production region useful for microchip lithography according to an embodiment of the present approach.

FIG. 9 illustrates a side view of a TR target 91 according to an embodiment of the present approach. The electron beam 99 (note that only 3 of the 1,000 individual beams are shown in FIG. 9) enters the target volume 98 and creates the light beam 95. In this embodiment, the BNNS-BNNT material 94 is electrostatically sprayed from vibrating nozzles 92. In some embodiments ends of the nozzles 93 may be negatively charged such that the BNNS-BNNT material 94 meets the Rayleigh criteria of having sufficient charge on the individual particles of BNNS-BNNT to keep the BNNS-BNNT material particles from attracting each other, and so that the BNNS-BNNT particles are attracted to the bottom of the target volume 96 towards collection chamber 97. The bottom of the target volume 96 may be held at ground potential. The combination of electrostatic and gravity forces induces the particles to disperse and travel through the target volume 98. The BNNTs and/or BNNT material 94 may be heated, and in some embodiments the temperature may be kept below 1,900 K by keeping the target volume 98 sufficiently large such that blackbody radiation removes the heat. Also, BNNT material is not thermally damaged at temperatures below 1,900 K. The walls of the target volume 98, feeding chamber 910, and collection chamber 97 may be cooled with standard water cooling loops or other conventional cooling methods, not shown, to remove heat. The BNNS-BNNT material 94 collected in the collection chamber 97 may be mechanically recirculated or recycled (not shown) back to the feeding chamber 911, such that the overall production process is continuous. In some embodiments, the entire TR target 91 may be under vacuum. The embodiments shown in FIGS. 8 and 9 may be especially useful for generating TR light for microchip lithography embodiments, among other applications.

to be useful for applications such as microchip lithography. It should be appreciated that various features may be adjusted for a particular embodiment to suit the desired application.

The density of the BNNS-BNNT material 94 in the target volume 98 may be optimized by having no more than one photon absorption length for the photon energy of interest, though in some embodiments using a longer length can enhance the amount of light. The photon absorption lengths for the photon wavelengths for the example being considered, 13.5 nm (91.8 eV) and 6.7 nm (185 eV) light useful for microchip lithography, are $4\times10^{-5}$ g/cm$^2$ and $1.8\times10^{-4}$ g/cm$^2$ respectively. In the example the target length of $4\times10^{-5}$ g/cm$^2$ will be utilized for the production of both 13.5 nm and 6.7 nm light so as to keep the total power developed in the target region low, plus a thickness $1.8\times10^{-4}$ g/cm$^2$ will be considered for 6.7 nm as an additional example.

The table below provides the overall parameters for the example embodiment configured for microchip lithography applications:

TABLE 1

Inputs and Outputs for 13.5 nm and 6.7 nm light sources for microchip lithography

| Input/Output | Parameter | Value | Units |
| --- | --- | --- | --- |
| I | Electron beam energy | 200 | MeV |
| O | Lorentz factor | 391 | |
| I | Injector energy | 3 | MeV |
| O | Linac energy | 197 | MeV |
| I | Injector current | 25 | mA |
| O | Injector power | 75 | kW |
| I | Number of recirculations | 1,000 | |
| O | Total current in main ring | 25 | A |
| I | BN density | 2.1 | g/cm$^3$ |
| I | Nano layers per surface - average | 2 | |
| I | Thickness per nano layer | 0.33 | nm |
| I | Plasma frequency | 29 | eV |
| I | Thickness | $4 \times 10^{-5}$ | g/cm$^2$ |
| I | Photon output bandwidth | 2 | % |
| I | Maximum temperature of material | 1,900 | K |
| I | Target volume width | 4 | cm |
| I | Target volume height | 4 | cm |
| O | Target volume length | 35 | cm |
| O | Photon beam total multiple scattering | 2.0 | mrad |
| O | Photon beam emittance | 290 | mm-mrad |
| I | Average photon production for all wavelengths | 10 | % |
| O | dE/dx (ionization loss) per station | 2 | kW |
| O | Total power loss per station | 41 | kW |
| I | Number of stations | 5 | |
| O | Total power for all stations | 207 | kW |
| O | Beam energy loss for extracted beam | 4.1 | % |
| I | Photon output wavelength (energy) | 13.5 (91.8) | nm (eV) |
| O | Formation length for 13.5 nm | 43 | nm |
| O | Production efficiency per layer for 13.5 nm | 7.9 | % |
| O | Light output for 13.5 nm | 29 | W |
| I | Photon output wavelength (energy) | 6.7 (185) | nm (eV) |
| O | Formation length for 6.7 nm | 86 | nm |
| O | Production efficiency per layer for 6.7 nm | 4.7 | % |
| O | Light output for 6.7 nm | 46 | W |
| O | Light output for 6.7 nm, 2X target, 250 MeV beam | 91 | W |

An additional mechanism to feed BNNS-BNNT material 94 into the target volume 98 within TR target 91 is to include vibration elements in the collection chamber 97. Vibration elements propel the BNNS-BNNT material 94 upward into the target volume 98. In some embodiments, the combination of vibration and electrostatic injection may be used to provide about ±2% uniformity in the average density of BNNS-BNNT material 94 in the target volume 98, such that the output light beam is kept sufficiently uniform in intensity It should be appreciated that the values in Table 1 are approximate, and have been selected for an exemplar embodiment useful for microchip lithography. For Input parameters, the electron beam energy, current, number of recirculations, target volume width and target volume height have been selected in this example to optimize the light output for conditions that current accelerator technology can achieve. It should be appreciated that other values may be used, particularly for different applications of the present approach. The output bandwidth of 2% has been selected to match what current 13.5 nm mirror technology can achieve. In determining the target volume length, it has been assumed that the total power loss per stations must be absorbed by the walls of the target volume while keeping the BNNS-BNNT temperature below 1,900 K. Some of the heating in the target volume will go out to the first mirror 87 and back up the entry beam pipe. The heat going into raising the temperature of the BNNS-BNNT material is miniscule in comparison to the TR heating.

The photon beam emittance comes from the combination of the photon cone discussed for light cone 17 shown in FIG. 1 and the combination of the width and height of the target volume. The production efficiency per layer is calculated from the thicknesses of the layers, number of layers, formation lengths and having the BNNS-BNNT orientations to be random.

The light power output of 29 W for 13.5 nm and 46 W for 6.7 nm is delivered to the first mirror 87 of FIG. 8. The last entry in the table above of 91 W for 6.7 nm is for where the target is twice as thick. To achieve this output, the beam energy has been increased to 250 MeV such as the keep the beam energy loss (not listed) below 10%, however the power generated by the TR radiation to the target volume is slightly over twice as much as indicated in the table for this condition. The value of 2% bandwidth has been selected for the example provided above. However, most mirrors currently being considered for 6.7 nm are in the range of 1% bandwidth. Consequently, the outputs light intensity for 6.7 nm would be half the values indicated in Table 1 above for the 1% bandwidth consideration.

The example above for microchip lithography has emphasized BNNS and BNNT, and to some extent CNT and graphene as the preferred materials for generation of broadband TR light and in particular TR light at 13.5 nm and 6.7 nm. It should be understood that all materials that can create surface boundaries with different dielectric constants will generate TR light and that the spectrum of light generated is very broad ranging from THz and far infrared to x-rays and even gamma rays depending on the energy of the incident particle and the configuration of the TR surfaces. For the example provided above for 13.5 nm and 6.7 nm light, in some embodiments other nanomaterials such as multiwall BNNT and multiwall CNT where the number of walls may range from 5 to 50 and beyond, and boron carbide (B4C) nanoparticles may be the preferred embodiment even though they may have metal impurities and be more amorphous than crystalline. For example, 20-100 nm diameter B4C nanoparticles will be closer to the formation lengths for 13.5 nm and 6.7 nm light, which may improve the production efficiency per particle. However, these 20-100 nm B4C nanoparticles only have one layer per particle and will consequently have many fewer TR surfaces, which will decrease the overall efficiency. In addition, the self-absorption of the TR radiation will scale with the mass for many wavelengths of light being generated, and mass scales with the radius cubed while the cooling blackbody radiation scales with the surface area and that scales with the radius squared. As one skilled in the art of designing specific implementations of targets for relativistic charged particle beams and for the generation of TR should know, the optimization of a given embodiment including the selection of target material will consider all of these factors when optimizing for the production of a selected wavelength of interest of TR generated light.

Figure 10:
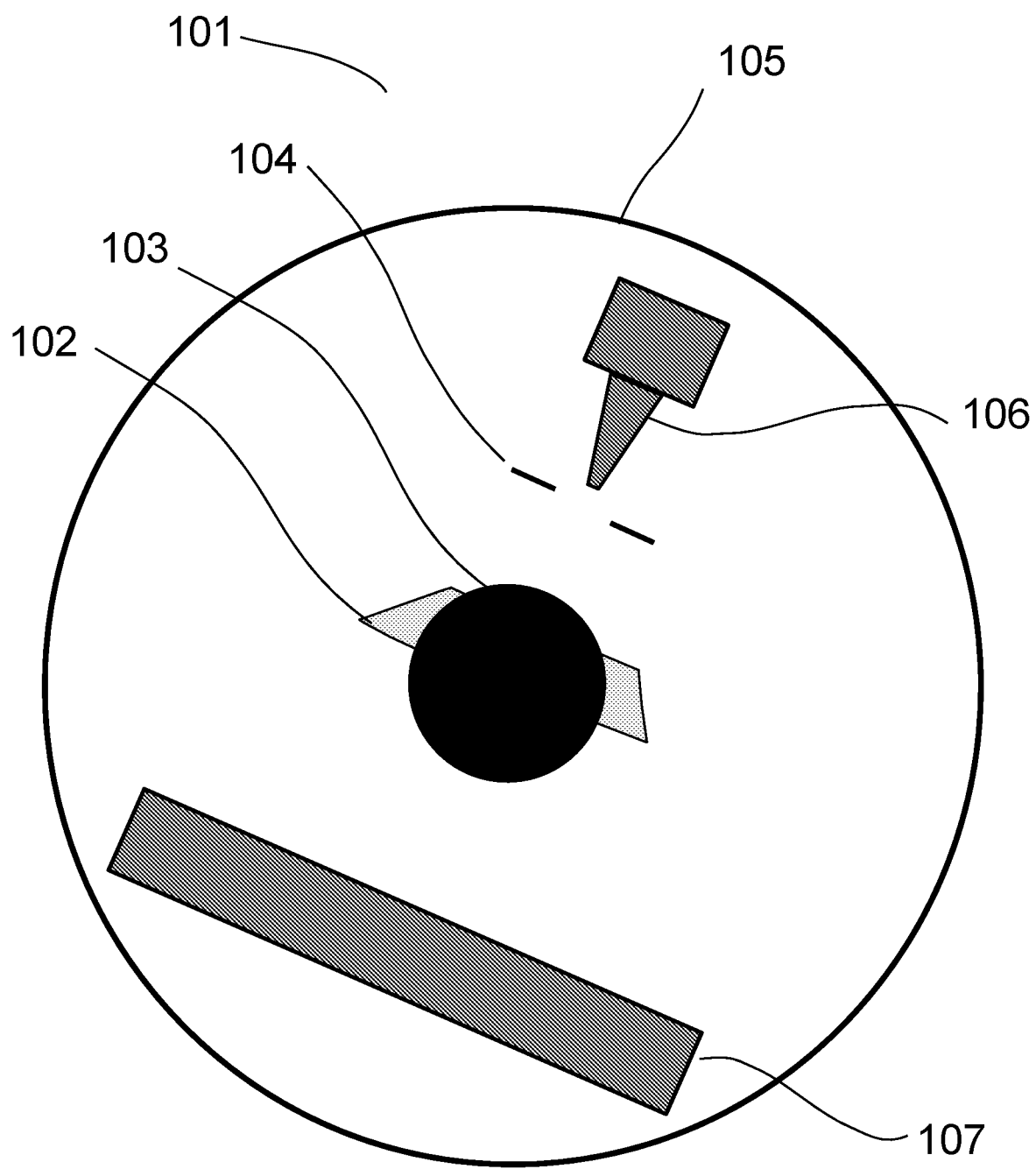
FIG. 10 illustrates the view looking into a relativistic charged beam for a TR light production region useful for determining the properties of the beam according to an embodiment of the present approach.

FIG. 10 illustrates a BNNS-BNNT light source for determining the profile for relativistic beam 103, including location. Beam 103 in FIG. 10 is coming out of the pages. In this embodiment, the preferred TR material can be BNNS, BNNT, or a BNNS-BNNT mixture as described above. Other materials may also be considered as discussed above, but the level of optical transparency and the thermal stability must be considered for the wavelengths of interest. Pulses of BNNS-BNNT 102 are ejected from a nozzle 106 by a combination of vibration and electrostatic charging with a negative electron pulse. As the waves of BNNS-BNNT material 102 leave the nozzle 106 they are accelerated by a combination of a positive charge pulse on a grid 104 and by moving in the general direction of a ground collection volume 107. The beam containment 105 is sufficiently far away not to influence the BNNS-BNNT flow and pulsations. The BNNS-BNNT flow, in turn, generates multiple waves of BNNS-BNNT flow TR material. FIG. 10 shows a single BNNS-BNNT wave 102 for simplicity, but it should be appreciated that multiple waves may be present at a given moment. As a given BNNS-BNNT wave 102 reaches the grid 104 its polarity is reversed so that the BNNS-BNNT wave 102 continues on to the collection volume 107. As the BNNS-BNNT wave 102 passes through the relativistic charged beam 103, TR light is emitted. The spatial profile of the relativistic charged beam 103 is determined by two measurements of light by detectors to be discussed for FIG. 11 that are down stream of the interaction region where the relativistic charged beam 103 has been bent away from the TR light beam by magnets: 1) the intensity of the light is correlated with the timing and mass distribution of the BNNS-BNNT wave, and 2) for TR light in the visual wavelength region known as optical transition radiation (OTR), a telescope of optical elements images the light distribution coming from the interaction region of the BNNS-BNNT wave 102 with the particle beam 103.

Figure 11:
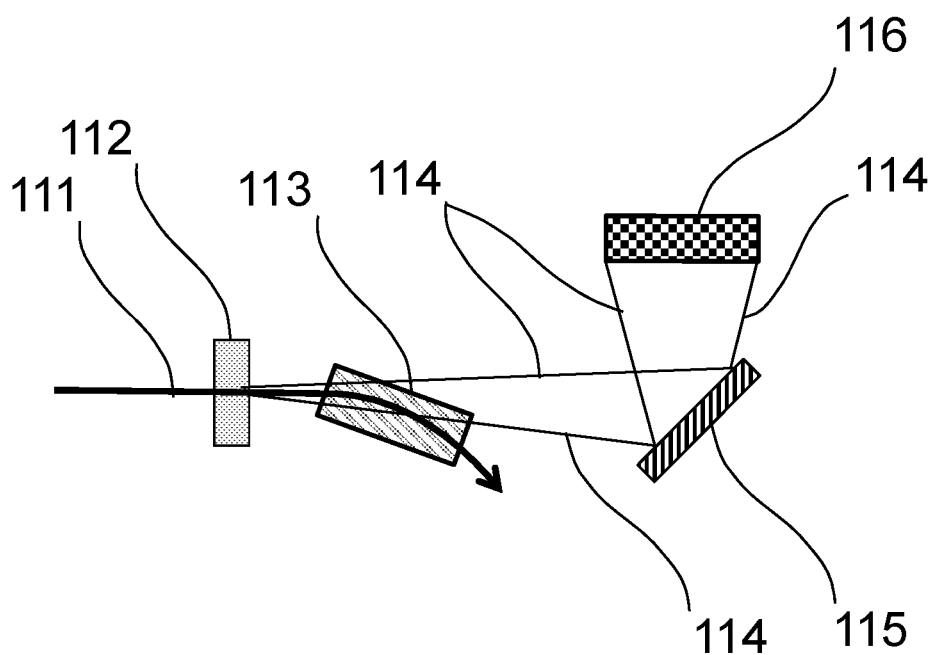
FIG. 11 illustrates the production and detection of TR light from a relativistic charged particle beam.

FIG. 11 illustrates the imaging of the TR coming from the light source discussed above with respect to the embodiments shown in FIGS. 4 and 10. The electron beam 111 produces TR beam or light envelope 114 in the BNNS-BNNT light source 112. The electron beam 111 is bent away from the TR light beam 114 by one or more magnets 113. The TR envelope of light 114 reflects off a front sided mirror 115 and impinges on a TR photon detector 116. The material used for coating the mirror 115 may be selected to optimally reflect TR photon wavelengths of interest. For example, for optical wavelengths with OTR typical aluminum or gold coatings can be utilized and the TR photon detector 116 can be a typical CCD camera. In some embodiments, the TR mirror 115 can be eliminated and the TR camera 116 can be located at the location indicated in FIG. 11 for the TR mirror 115. The embodiments shown in FIGS. 10 and 11 may be especially useful for beam profiling embodiments.

As one of ordinary skill in the art should appreciate, for OTR a spatial resolution of 10 microns can achieved for a measurement the light coming from a relativistic charged beam 103 at the location of the BNNS-BNNT wave 102 or as in the case of a BNNT mat 41 described above in FIG. 4. The advantage of the mat as shown in FIG. 4 is that if BNNS-BNNT is utilized, the material is self-supporting within the mat. In addition, a BNNS-BNNT mat would not involve the complexity of the TR light source system discussed for FIG. 10. The advantage of the BNNS-BNNT particle cloud as illustrated in FIG. 10 is that very low amounts of material can be used for very high current relativistic charged particle beams.

As one of ordinary skill in the art should appreciate, there is great flexibility in the design of the accelerating subsystems, choices of beam energy, and choices of beam current and optical elements. The examples provided herein serve to guide the exposition of the concepts. It should be appreciated that embodiments may be configured for other applications without departing from the present approach. The methods described in the present approach may be embodied in other specific forms without departing from the spirit or essential characteristics thereof. The disclosed embodiments are therefore to be considered in all respects as illustrative and not restrictive by the foregoing description.

What is claimed is:

1. A transition radiation light source comprising:
   an electron beam injector configured to emit an electron beam along a beam path;
   an electron accelerator system configured to receive and accelerate the electron beam along the beam path;
   at least one transition radiation production target along the beam path and having at least one transition radiation material having at least one of a nanotube material, a nanosheet material, and a nanoparticle material;
   wherein the at least one transition radiation material comprises at least one of boron nitride nanotubes and boron nitride nanosheets.

2. The transition radiation light source of claim 1, wherein the light source is configured for multiple electron beam accumulation.

3. The transition radiation light source of claim 1, wherein the electron beam is rastered along the beam path upstream to the at least one transition radiation production.

4. The transition radiation light source of claim 1, wherein the electron accelerator includes an energy recovery linac.

5. The transition radiation light source of claim 1, where the electron accelerator includes an electron beam dump.

6. The transition radiation light source of claim 1, where the electron accelerator includes an electron beam dump.

7. The transition radiation light source of claim 1, wherein the transition radiation material comprises boron nitride nanotubes and boron nitride nanosheets.

8. The transition radiation light source of claim 1, wherein the transition radiation material includes boron nitride nanosheets.

9. The transition radiation light source of claim 1, wherein the transition radiation material further comprises additional particles comprising at least one of boron nitride, aluminum oxide, aluminum nitride, and carbon boride.

10. The transition radiation light source of claim 9, wherein the additional particulates have an average size optimized for a desired light wavelength.

11. The transition radiation light source of claim 1, wherein the transition radiation material further comprises at least one of boron nitride, aluminum oxide, aluminum nitride, and carbon boride.

12. The transition radiation light source of claim 11, wherein the additional particulates have an average size optimized for a desired light wavelength.

13. The transition radiation light source of claim 1, wherein the at least one transition radiation material is electrostatically sprayed into the at least one transition radiation production target.

14. The transition radiation light source of claim 1, wherein the at least one transition radiation production target comprises a chamber including a pulsation element configured to propel the at least one transition radiation material into a target volume within the chamber.

15. The transition radiation light source of claim 1, wherein the at least one transition radiation material is continuously circulated through the at least one transition radiation production target.

16. A method for generating transition radiation light comprising:
   passing a relativistic charged particle beam through a transition radiation target having at least one transition radiation material having at least one of a nanotube material, a nanosheet material, and a nanoparticle material;
   wherein the at least one transition radiation material comprises at least one of boron nitride nanotubes, boron nitride nanosheets, boron nitride nanotube powder, boron nitride nanotube mats, boron nitride nanosheet powders, boron nitride nanosheet mats, boron nitride nanotube threads, and boron nitride nanosheet threads.

17. A transition radiation light source target comprising a chamber configured to receive and emit a relativistic charged particle beam along a beam path, and at least one transition radiation material having at least one of a nanotube material, a nanosheet material, and a nanoparticle material, the transition radiation material within the chamber and positioned such that the beam path passes through the at least one transition radiation material;
   wherein the at least one transition radiation material comprises at least one of boron nitride nanotubes, boron nitride nanosheets, boron nitride nanotube powder, boron nitride nanotube mats, boron nitride nanosheet powders, boron nitride nanosheet mats, boron nitride nanotube threads, and boron nitride nanosheet threads.

18. The transition radiation light source of claim 17, wherein the at least one transition radiation production target comprises a chamber including a pulsation element configured to propel the at least one transition radiation material into a target volume within the chamber.

* * * * *